(12) United States Patent
Lagergren

(10) Patent No.: US 9,183,013 B2
(45) Date of Patent: *Nov. 10, 2015

(54) SYSTEM AND METHOD FOR REDUNDANT ARRAY COPY REMOVAL IN A POINTER-FREE LANGUAGE

(71) Applicant: ORACLE INTERNATIONAL CORPORATION, Redwood Shores, CA (US)

(72) Inventor: Marcus Lagergren, Lidingo (SE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,414

(22) Filed: Mar. 21, 2014

(65) Prior Publication Data

US 2014/0201742 A1 Jul. 17, 2014

Related U.S. Application Data

(63) Continuation of application No. 11/954,103, filed on Dec. 11, 2007, now Pat. No. 8,713,546.

(60) Provisional application No. 60/870,600, filed on Dec. 18, 2006.

(51) Int. Cl.
*G06F 9/44* (2006.01)
*G06F 9/445* (2006.01)
*G06F 9/45* (2006.01)

(52) U.S. Cl.
CPC .......... *G06F 9/44589* (2013.01); *G06F 8/4441* (2013.01)

(58) Field of Classification Search
CPC ............................ G06F 8/4441; G06F 9/44589
USPC ......................................................... 717/151
See application file for complete search history.

(56) References Cited

U.S. PATENT DOCUMENTS

| 4,012,725 | A |   | 3/1977  | Spangler |
|-----------|---|---|---------|----------|
| 4,180,854 | A |   | 12/1979 | Walden   |
| 5,790,867 | A | * | 8/1998  | Schmidt et al. ............... 717/155 |
| 6,505,344 | B1 | * | 1/2003 | Blais et al. ..................... 717/151 |
| 6,675,378 | B1 | * | 1/2004 | Schmidt ........................ 717/154 |
| 6,684,393 | B1 | * | 1/2004 | Loen et al. .................... 717/151 |
| 6,760,905 | B1 | * | 7/2004 | Hostetter et al. .............. 717/148 |

(Continued)

OTHER PUBLICATIONS

Javacard, javacard.framework Class Util, Sun Microsystems, Inc. (2005) retrieved from http://www.win.tue.nl/pinpasjc/docs/apis/jc222/javacard/framework/Util.html on Oct. 29, 2014.*

(Continued)

*Primary Examiner* — Theodore Hebert
(74) *Attorney, Agent, or Firm* — Tucker Ellis LLP

(57) ABSTRACT

A system and method for redundant array copy removal in a virtual machine (VM), or other runtime environment, and particularly for use in a system that includes a Java Virtual Machine (JVM). In pointer free languages array copy operations are common and time consuming. Embodiments of the present invention enable the compiler to detect situations where the compiled code can safely use the source array as the destination array without performing any copy operation. By avoiding array copy operations, the performance of the application is improved.

12 Claims, 2 Drawing Sheets

(56) References Cited

U.S. PATENT DOCUMENTS

| | | |
|---|---|---|
| 7,076,773 B2 * | 7/2006 | Schmidt .................... 717/148 |
| 7,168,071 B2 * | 1/2007 | Wu et al. .................... 717/153 |
| 7,257,685 B2 * | 8/2007 | Tene et al. .................... 711/154 |
| 2002/0166116 A1 | 11/2002 | Eidt |
| 2004/0267804 A1 | 12/2004 | Fesko |
| 2006/0136875 A1 | 6/2006 | Thorpe |
| 2007/0074228 A1 * | 3/2007 | Suzumura et al. ............ 719/330 |
| 2007/0100967 A1 * | 5/2007 | Smith et al. .................. 709/219 |
| 2007/0150509 A1 * | 6/2007 | Lev et al. .................. 707/103 R |
| 2008/0091697 A1 * | 4/2008 | Cui et al. .................... 707/101 |
| 2008/0148246 A1 * | 6/2008 | Lagergren .................... 717/148 |
| 2014/0201742 A1 * | 7/2014 | Lagergren .................... 718/1 |

OTHER PUBLICATIONS

Allen, Array.Copy Method Usage in C#, Jun. 13, 2009, 4 pages.
Troll Tech, QT Shared Classes, May 1, 2001, 1 page.
Blanchet, Escape Analysis for Object Oriented Languages, Application to Java, 1999, pp. 20-34.
Friesen, Study Guide: Java's Character and Assorted String Classes Support Text Processing, Oct. 4, 2002, 7 pages.
Choi, Escape Analysis for Java, 1999, 1-20 pages.

* cited by examiner

SYSTEM AND METHOD FOR REDUNDANT ARRAY COPY REMOVAL IN A POINTER-FREE LANGUAGE

CLAIM OF PRIORITY

This application is a continuation of U.S. patent application Ser. No. 11/954,103, titled "SYSTEM AND METHOD FOR REDUNDANT ARRAY COPY REMOVAL IN A POINTER-FREE LANGUAGE", filed Dec. 11, 2007, now U.S. Pat. No. 8,713,546, issued on Apr. 29, 2014; which claims the benefit of U.S. Provisional Application No. 60/870,600, titled "SYSTEM AND METHOD FOR REDUNDANT ARRAY COPY REMOVAL IN A POINTER-FREE LANGUAGE", filed Dec. 18, 2006; which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to virtual machine environments and other runtime environments, and in particular to a system and method for improving performance by removing redundant array copying within such an environment.

BACKGROUND

Virtual machines are abstract computers that allow for portability of software, typically for running virtual applications between different underlying computer architectures. A virtual machine (VM) is a complex software product that is implemented upon a particular computer hardware platform and/or operating system. The VM then provides a uniform layer of abstraction between the hardware platform and any compiled software applications that will run thereon. Virtual machines are considered essential for the portability of certain technologies, such as Java. The Java Virtual Machine (JVM) allows compiled Java programs to be run on the JVM, independently of whatever hardware or operating system may be used underneath. Examples of available JVMs include the Sun Java Virtual Machine from Sun Microsystems, Inc., and the JRockit Virtual Machine from BEA Systems, Inc.

A real CPU understands and executes instructions native to that CPU (commonly called native code). In comparison, a virtual machine understands and executes virtual machine instructions (commonly called bytecode).

A virtual machine such as the JRockit Virtual Machine from BEA Systems, Inc. compiles the bytecode into native machine code tailored for the particular OS/CPU combination on which JRockit is running. It does so using compiler optimization techniques. Examples of such compiler techniques are described in "Advanced Compiler Design and Implementation" by Steven S. Muchnik; "Crafting a Compiler with C" by Charles N. Fischer and Richard J. LeBlanc, Jr.; and "Compilers" by Alfred V. Aho, Ravi Sethi, Jeffrey D. Ullman, each of which are incorporated herein by reference.

One feature that is commonly used to increase performance in a VM and in pointer free languages such as Java is the array copy operation, in which an array can be optimized by allocating a new larger array, and copying the contents into the new array. However, array copying is a time expensive operation on modern hardware with its memory bandwidth limitations. This is the area the present invention is designed to address.

SUMMARY

Disclosed herein is a system and method for redundant array copy removal in a virtual machine (VM), or other runtime environment, and particularly for use in a system that includes a Java Virtual Machine (JVM). Array copying is a time expensive operation on modern hardware with its memory bandwidth limitations. Unfortunately array copying is also common in pointer free languages like Java.

An embodiment of the present invention addresses this problem by providing a system and method for redundant array copy removal where the compiled bytecode uses the source as the destination. In accordance with an embodiment, the invention provides a system for redundant array copy removal in a virtual machine environment, comprising: a virtual machine for executing a software application; a memory space for storing the application bytecode; a bytecode compiler, comprising an escape analyzer, or an escape analyzer process or logic, and functionality to add array equivalence guards to the compiled bytecode; a memory space for the compiled bytecode; and a memory space for use by the virtual machine in storing software objects and pointers as part of the software application.

DETAILED DESCRIPTION

Figure 1:
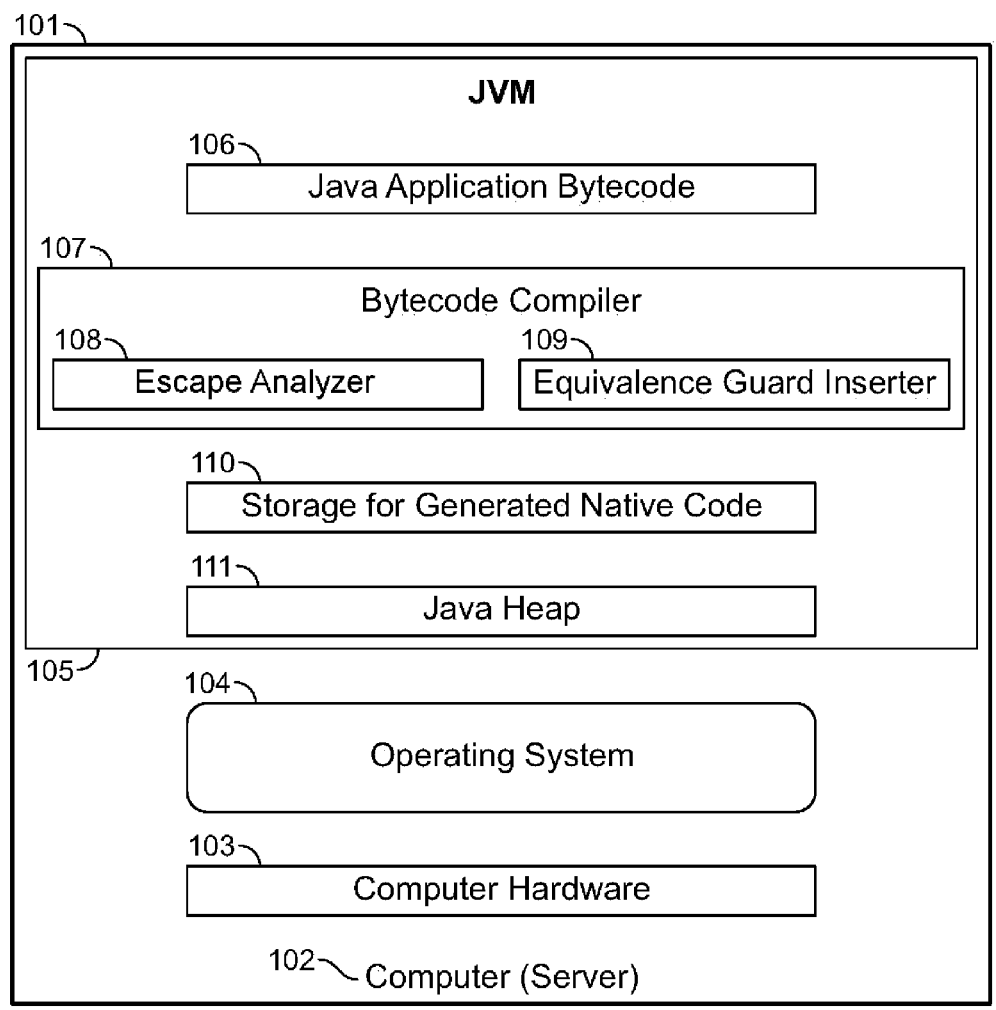
FIG. 1 shows an illustration of a system in accordance with an embodiment, which uses a compiler comprising an escape analyzer, or an escape analyzer process or logic, and functionality to add array equivalence guards to the compiled bytecode to remove redundant array copying.

Disclosed herein is a system and method for redundant array copy removal in a virtual machine (VM), or other runtime environment, and particularly for use in a system that includes a Java Virtual Machine (JVM).

Escape analysis is an optimization technique that can be used to determine if objects allocated within a certain scope (most often a method) are never used anywhere outside the scope. Given that it is possible to detect this, a number of optimizations can be applied. For example:

Stack allocation: An object can be allocated on the stack instead of on the heap if the scope of the object is within the function. Using the stack instead of the heap saves resources (both at allocation time and later at garbage collect time) and requires no synchronized allocation; and Object explosion: "Exploding" the object into its members (fields), turning all loads and stores of these into local variable accesses, thus not needing to allocate the object at all. Sometimes object explosion can be performed within a limited scope, even if the object potentially escapes out into a super-scope, by materializing the object on its way out of the sub-scope.

One way of performing an escape analysis is to use a feedback-driven process, where one starts out with an allocation operator in a given scope, and tracks the uses of the newly allocated object. Given that the object is moved or joined (in SSA-form) into different variables (aliases), these are also tracked. Whenever the object or its aliases "escape" (for example, are stored in memory outside the scope or passed as parameters to calls) the analysis is ended. If the analysis is finished without detecting that the object escapes the scope, then the object is said to be "local", and optimizations such as those described above can be applied.

In a pointer free language, only object references are used. A reference may never be changed; once instantiated it always points to the same object. This is very convenient for some things (for example, no pointer aliasing issues can appear when optimizing). However, it is inconvenient for other things (for example, expanding the capacity of an array, which has to be done by allocating a new larger array and copying the contents into the new array). In a pointer based language, the same memory space that represents the array can be enlarged if the heap permits. Java is a pointer free language, although it is important not to confuse resetting references to other instances with pointers that can be modified. (Furthermore, some implementations of the JVM use pointers internally). Therefore array copy operations are common in Java, and a type usage is buffer expansion:

Listing 1

```
int buf[ ];
void ensureCapacityAt(int index) {
    if (index >= buf.length) {
        int newbuf[ ] = new int[index*2];
        System.arraycopy(buf, 0, newbuf, 0, buf.length);
        buf = newbuf;
    }
}
```

Array copying is a time expensive operation on modern hardware with its memory bandwidth limitations. Unfortunately array copying is also common in pointer free languages like Java. Since memory copying is time expensive because of the limited memory bandwidth in modern hardware, any reduction in the number of arrays copied will immediately translate into a performance improvement.

An embodiment of the present invention addresses this problem by providing a system and method for redundant array copy removal, wherein the compiled bytecode uses the source as the destination. In accordance with an embodiment, the system allows for redundant array copy removal in a virtual machine environment, comprising: a virtual machine for executing a software application; a memory space for storing the application bytecode; a bytecode compiler, comprising an escape analyzer, or an escape analyzer process or logic, and functionality to add array equivalence guards to the compiled bytecode; a memory space for the compiled bytecode; and a memory space for use by the virtual machine in storing software objects and pointers as part of the software application.

FIG. 1 shows an illustration of a system in accordance with an embodiment. In this embodiment, the system comprises a compiler further comprising an escape analyzer, or an escape analyzer process or logic, and functionality to add array equivalence checks to the compiled bytecode to remove redundant array copying. As shown in FIG. 1, the system 101 comprises a computer server 102, that further comprises a computer hardware 103. The computer hardware supports an operating system 104. Inside the Java Virtual Machine 105 (JVM) the application bytecode 106 is compiled using a bytecode compiler 107. The bytecode compiler uses the escape analyzer, or an escape analyzer process or logic, 108 to find array copy operations wherein the source array can potentially be used as the destination. However, the final checks to determine if the substitution can take place have to be done at runtime, and the necessary check code added to the compiled code by the equivalence guard inserter 109. The compiled bytecode is then stored in the storage for native code 110.

The Java heap 111 is used for storing software objects and pointers (or more specifically the arrays) as part of the software application.

Listing 2

```
class StringCollection {
    String strings[ ];
    public String toString( ) {
        int arrayLength = 0;
        for (int i = 0; i < size; i++) {
            arrayLength += strings[i].length( );
        }
        char value[ ] = new char[arrayLength];
        for (int i = 0, index = 0; i < size; i++) {
            strings[i].getChars(0, strings[i].length( ),value,index);
            index += strings[i].length( );
        }
        return new String(value);
    }
}
```

In accordance with an embodiment, the StringCollection class is configured to create one single long string as a response to the toString method call. The string constructor used in StringCollection uses the constructor, which takes a char array as an argument:

```
char internal_value[ ];
public String(char value[ ]) {
    int size = value.length;
    char[ ] v = new char[size];
    System.arraycopy(value, 0, v, 0, size);
    this.offset = 0;
    this.count = size;
    this.internal_value = v;
}
```

Since the constructor does not know anything about the context it is called from, it has to assume that it cannot safely use the char array argument as its string content. Since string objects are immutable, it is not safe to allow anyone else to keep pointers to the char array representing the value of the string. To be safe, the string constructor makes a copy of the char array. However, in accordance with an embodiment the system is configured to detect that value was allocated locally in StringCollection.toString and does not otherwise escape. It will also detect that the entire array is copied. This means that it is safe to use the argument value as the internal_value without any array copying.

To do this, in accordance with an embodiment, the system requires the string constructor to be inlined (which is a common optimization and in this instance is a reasonable optimization since the constructor is short).

Listing 3

```
...
char value[ ] = new char[arrayLength];
...
int size = value.length;
char v[ ] = new char[size];
System.arraycopy(value, 0, v, 0, size);
...
the_string.internal_value = v;
...
```

As shown in Listing 3, the relevant code of the constructor has been inlined. In accordance with an embodiment, when the system applies escape analysis (for example, to the code in Listing 3), it detects that value does not escape the local scope, whereas v does escape, since it is stored within a field in an object that does itself escape. In accordance with an embodiment, the system can therefore replace the allocation of the char array and the call to arraycopy with a single move, in this instance the_string.internal_value=value.

Figure 2:
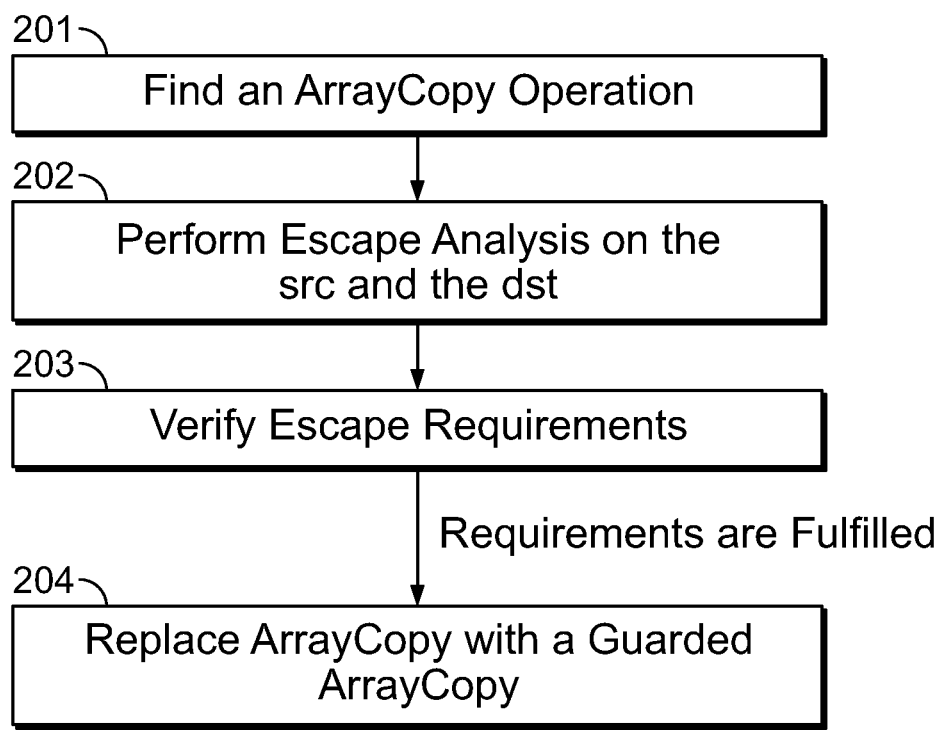
FIG. 2 shows a flowchart in accordance with an embodiment, that illustrates the process of identifying array copy operations that can be removed.

FIG. 2 shows a flowchart in accordance with an embodiment of the invention that illustrates the process of identifying array copy operations that can be removed. As shown in FIG. 2, the process begins with finding an array copy operation 201. The next step is to perform escape analysis on the source array and the destination array 202. The array copy operation is a candidate for redundant copy removal if, in step 203, the following requirements are satisfied:

(1) the source and destination are allocated within the scope;
(2) the source does not escape the scope;
(3) the source and its aliases must not be modified after the arraycopy;
(4) the destination or its aliases must not escape before the arraycopy; and
(5) the arrays must be of the same type, or the destination array is a more generic array (for example, an object array).

If all of the requirements are met, then, in step 204, the array copy can be replaced with a guarded array copy. For example, if the array copy before replacement is:

```
dest = new array
arracopy (source, from, dest, to, length);
``` then, after replacement, the guarded array copy will be:

```
if ((source.length == dest.length == length) &&
    ((from == to == 0)) {
    dest = source;
} else {
    dest = new array
    arracopy(source, from, dest, to, length);
}
```

The length guard, which verifies that the whole array is about to be copied, can be efficiently implemented as follows:

Listing 4

```
xor src.length, dest.length -> tmp
xor src.length, tmp -> tmp2
or tmp, from -> tmp
or tmp, to -> tmp
or tmp, tmp2 ->tmp
```

As shown above, the variable tmp will be 0 if and only if the whole array is to be copied. Standard compiler optimizations will improve the performance of this guard if any of the parameters are constants. For example, if the indexes from and to are zero, then the two or operations involving these parameters will be considered no-ops and will be optimized away.

The compiler can also predict that the else case will happen rarely, and optimize the control flow for the first case. In accordance with an embodiment, the system can improve performance by reducing the number of CPU cycles spent on array copy operations. It can also improve performance by delaying the next garbage collect because of the lower allocation rate.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic or JRockit environment, other application servers, virtual machines, JVMs, computing environments and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for redundant array copy removal in a virtual machine environment, comprising:
   a computer including a microprocessor;
   a virtual machine running on the computer, that executes one or more software applications;

a bytecode compiler that compiles application bytecode into compiled bytecode for execution by the virtual machine;

a memory space for storage of the application bytecode and the compiled bytecode;

an escape analyzer logic that determines array equivalence guards to be added to the compiled bytecode, to allow for redundant array copy removal, including determining, within the compiled bytecode, for one or more array copy operations that include a source array and a destination array, those array copy operations that can be modified using a guarded array copy;

wherein the bytecode compiler then replaces, within the compiled bytecode, one or more of those array copy operations that have been determined can be modified, with a guarded array copy operation that indicates when a source array is to be used as a destination array;

wherein determining whether an array copy operation can be modified includes comparing the length of a source array indicated by the array copy operation, with the length of a destination array indicated by the array copy operation, and comparing a starting position within the source array as indicated by the array copy operation with a starting position of the destination array as indicated by the array copy operation, to determine that the source array can be used as the destination array so that the destination array is not created.

2. The system of claim 1 wherein the escape analyzer logic makes its determinations on each particular array copy operation by performing an escape analysis on the source array and the destination array included with the particular array copy operation to determine if the particular array copy operation is a candidate for redundant array copy removal.

3. The system of claim 2 wherein the escape analyzer logic determines that the array copy can be replaced with a guarded array copy if the requirements of the source and destination are allocated within the scope, the source does not escape the scope, the source and its aliases are not modified after the array copy, the destination or its aliases do not escape before the array copy, and the arrays are of the same type, or the destination array is a more generic array, are satisfied.

4. The system of claim 1 wherein the system determines at runtime if the substitution can take place, and the necessary check code added to the compiled code by an equivalence guard inserter, prior to the compiled bytecode being stored as native code.

5. A method for redundant array copy removal in a virtual machine environment, comprising the steps of:

executing one or more software applications on a virtual machine;

providing a bytecode compiler that compiles application bytecode into compiled bytecode for execution by the virtual machine;

providing a memory space for storage of the application bytecode and the compiled bytecode;

adding array equivalence guards to the compiled bytecode, to allow for redundant array copy removal, including determining, within the compiled bytecode, for one or more array copy operations that include a source array and a destination array, those array copy operations that can be modified using a guarded array copy; and upon the requirements being satisfied, replacing, within the compiled bytecode, one or more of those array copy operations that have been determined can be modified, with a guarded array copy operation that indicates when its source array is to be used as its destination array;

wherein determining whether an array copy operation can be modified includes comparing the length of a source array indicated by the array copy operation, with the length of a destination array indicated by the array copy operation, and comparing a starting position within the source array as indicated by the array copy operation with a starting position of the destination array as indicated by the array copy operation, to determine that the source array can be used as the destination array.

6. The method of claim 5, further comprising making a determination on each particular array copy operation by performing an escape analysis on the source array and the destination array included with the particular array copy operation to determine if the particular array copy operation is a candidate for redundant array copy removal.

7. The method of claim 6, further comprising determining that the array copy can be replaced with a guarded array copy if the requirements of the source and destination are allocated within the scope, the source does not escape the scope, the source and its aliases are not modified after the array copy, the destination or its aliases do not escape before the array copy, and the arrays are of the same type, or the destination array is a more generic array, are satisfied.

8. The method of claim 5, further comprising determining at runtime if the substitution can take place, and the necessary check code added to the compiled code by an equivalence guard inserter, prior to the compiled bytecode being stored as native code.

9. A non-transitory computer readable storage medium, including instructions stored thereon which when executed cause the computer to perform the steps comprising:

executing one or more software applications on a virtual machine;

providing a bytecode compiler that compiles application bytecode into compiled bytecode for execution by the virtual machine;

providing a memory space for storage of the application bytecode and the compiled bytecode;

adding array equivalence guards to the compiled bytecode, to allow for redundant array copy removal, including determining, within the compiled bytecode, for one or more array copy operations that include a source array and a destination array, those array copy operations that can be modified using a guarded array copy; and upon the requirements being satisfied, replacing, within the compiled bytecode, one or more of those array copy operations that have been determined can be modified, with a guarded array copy operation that indicates when its source array is to be used as its destination array;

wherein determining whether an array copy operation can be modified includes comparing the length of a source array indicated by the array copy operation, with the length of a destination array indicated by the array copy operation, and comparing a starting position within the source array as indicated by the array copy operation with a starting position of the destination array as indicated by the array copy operation, to determine that the source array can be used as the destination array.

10. The non-transitory computer readable storage medium of claim 9, further comprising making a determination on each particular array copy operation by performing an escape analysis on the source array and the destination array included with the particular array copy operation to determine if the particular array copy operation is a candidate for redundant array copy removal.

11. The non-transitory computer readable storage medium of claim 10, further comprising determining that the array copy can be replaced with a guarded array copy if the requirements of the source and destination are allocated within the scope, the source does not escape the scope, the source and its aliases are not modified after the array copy, the destination or its aliases do not escape before the array copy, and the arrays are of the same type, or the destination array is a more generic array, are satisfied.

12. The non-transitory computer readable storage medium of claim 9, further comprising determining at runtime if the substitution can take place, and the necessary check code added to the compiled code by an equivalence guard inserter, prior to the compiled bytecode being stored as native code.

* * * * *